(12) United States Patent
Duc et al.

(10) Patent No.: US 11,973,808 B2
(45) Date of Patent: Apr. 30, 2024

(54) ELECTRONIC DEVICE FOR PROVIDING CONFERENCE SERVICE AND METHOD OF THE SAME

(71) Applicant: Samsung Electronics Co., Ltd., Suwon-si (KR)

(72) Inventors: Nguyen Ngoc Duc, Suwon-si (KR); Nguyen The Nghia, Suwon-si (KR); Tran Xuan Toan, Suwon-si (KR); Doan Huy My, Suwon-si (KR); Nguyen Van Hien, Suwon-si (KR); Nguyen Van Sinh, Suwon-si (KR); Pham The Huy, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/310,876

(22) Filed: May 2, 2023

(65) Prior Publication Data

US 2024/0015190 A1    Jan. 11, 2024

Related U.S. Application Data

(63) Continuation of application No. PCT/KR2023/003821, filed on Mar. 22, 2023.

(30) Foreign Application Priority Data

Jul. 11, 2022 (KR) .................. 10-2022-0085295

(51) Int. Cl.
*H04L 65/1069* (2022.01)
*H04L 65/1096* (2022.01)
*H04L 65/401* (2022.01)

(52) U.S. Cl.
CPC ...... *H04L 65/1069* (2013.01); *H04L 65/1096* (2013.01); *H04L 65/401* (2022.05)

(58) Field of Classification Search
CPC .................................................. H04L 65/1069
See application file for complete search history.

(56) References Cited

U.S. PATENT DOCUMENTS 9,231,919 B2    1/2016  Rieger et al.
9,692,886 B2    6/2017  Mufti et al.
(Continued)

FOREIGN PATENT DOCUMENTS

JP          4137769 B2     8/2008
JP       2008-258690 A    10/2008
(Continued)

OTHER PUBLICATIONS

Shiuh-Jeng Wang, "Anonymous wireless authentication on a portable cellular mobile system", IEEE Transactions on Computers (vol. 53, Issue: 10), Oct. 2004.
(Continued)

*Primary Examiner* — Philip C Lee
(74) *Attorney, Agent, or Firm* — Jefferson IP Law, LLP

(57) ABSTRACT

An electronic device is provided. The electronic device includes a communication circuit, a memory, and a processor configured to identify an occurrence of a conference event for establishing a conference call in which a plurality of external electronic devices participate, identify whether at least one of the plurality of external electronic devices is anonymous, generate an identification key to be mutually shared by a pair of an anonymous electronic device among the plurality of external electronic devices and the electronic device and transmit the identification key to the anonymous electronic device through the communication circuit when the at least one of the plurality of external electronic devices is anonymous, and generate the conference call in which the plurality of external electronic devices participate.

18 Claims, 12 Drawing Sheets

(56) References Cited

U.S. PATENT DOCUMENTS

2009/0083183 A1* 3/2009 Rao .................. G06Q 50/01
                                                    705/50
2022/0353468 A1* 11/2022 Walia .................. G16H 80/00

FOREIGN PATENT DOCUMENTS

| KR | 10-2006-0078218 A | 7/2006 |
| KR | 10-2015-0025894 A | 3/2015 |
| KR | 10-1950073 B1 | 2/2019 |
| WO | 2008/082203 A1 | 7/2008 |
| WO | 2016/064079 A1 | 4/2016 |

OTHER PUBLICATIONS

N.J Croft et al., "Anonymous Mobile Conference Calls", Southern African Telecommunication Networks and Applications Conference 2006 (SATNAC 2006), 2006.
International Search Report and written opinion dated Jun. 27, 2023, issued in International Application No. PCT/KR2023/003821.

* cited by examiner

ELECTRONIC DEVICE FOR PROVIDING CONFERENCE SERVICE AND METHOD OF THE SAME

CROSS-REFERENCE TO RELATED APPLICATION(S)

This application is a continuation application, claiming priority under § 365(c), of an International application No. PCT/KR2023/003821, filed on Mar. 22, 2023, which is based on and claims the benefit of a Korean patent application number filed on Jul. 11, 2022, in the Korean Intellectual Property Office, the disclosure of which is incorporated by reference herein in its entirety.

TECHNICAL FIELD

The disclosure relates to an electronic device for providing a conference service and a method therefor. More particularly, the disclosure relates to an electronic device for providing a conference service having various functions and a method therefor.

BACKGROUND ART

An Internet protocol (IP) multimedia subsystem (IMS) is a system for providing a multimedia service based on an IP, and is a multimedia service platform for an IP-based next-generation network capable of providing various multimedia services for a user equipment (UE) regardless of the location of the UE.

Currently, a multi-party call service is provided through the IMS, in which a plurality of UEs including a different anonymous UE may perform a multi-party call, and a conference service allowing a conference call with designated UEs is provided.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

A conference service provided through an Internet protocol (IP) multimedia subsystem (IMS) in a fourth-generation (4G) or fifth-generation (5G) communication network provides a limited function for an anonymous user equipment (UE).

Aspects of the disclosure are to address at least the above-mentioned problems and/or disadvantages and to provide at least the advantages described below. Accordingly, an aspect of the disclosure is to provide various functions for a plurality of UEs including an anonymous UE in a conference service provided through an IMS.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a communication module, a memory, and a processor configured to be operatively connected to the communication module and the memory, wherein the memory may store an instruction, wherein the instruction, when executed, may be configured to cause the processor to identify an occurrence of a conference event for establishing a conference call in which a plurality of external electronic devices participate, identify whether at least one of the plurality of external electronic devices is anonymous, based on identifying that the at least one of the plurality of external electronic devices is anonymous, generate an identification key to be mutually shared by a pair of an anonymous electronic device among the plurality of external electronic devices and the electronic device and transmit the identification key to the anonymous electronic device through the communication circuit, and generate the conference call in which the plurality of external electronic devices participate.

In accordance with another aspect of the disclosure, a method for an electronic device is provided. The method includes identifying an occurrence of a conference event for establishing a conference call in which a plurality of external electronic devices participate, identifying whether at least one of the plurality of external electronic devices is anonymous, based on identifying that the at least one of the plurality of external electronic devices is anonymous, generating an identification key to be mutually shared by a pair of an anonymous electronic device among the plurality of external electronic devices and the electronic device and transmitting the identification key to the anonymous electronic device, and generating the conference call in which the plurality of external electronic devices participate.

Advantageous Effects of Invention

According to various embodiments, various functions, such as call separation of a participating terminal, may be provided while performing a conference service provided through an IMS.

According to various embodiments, various functions may be provided to separate a call with a participating terminal and to establish a new call with the separated terminal while performing a conference service provided through an IMS.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
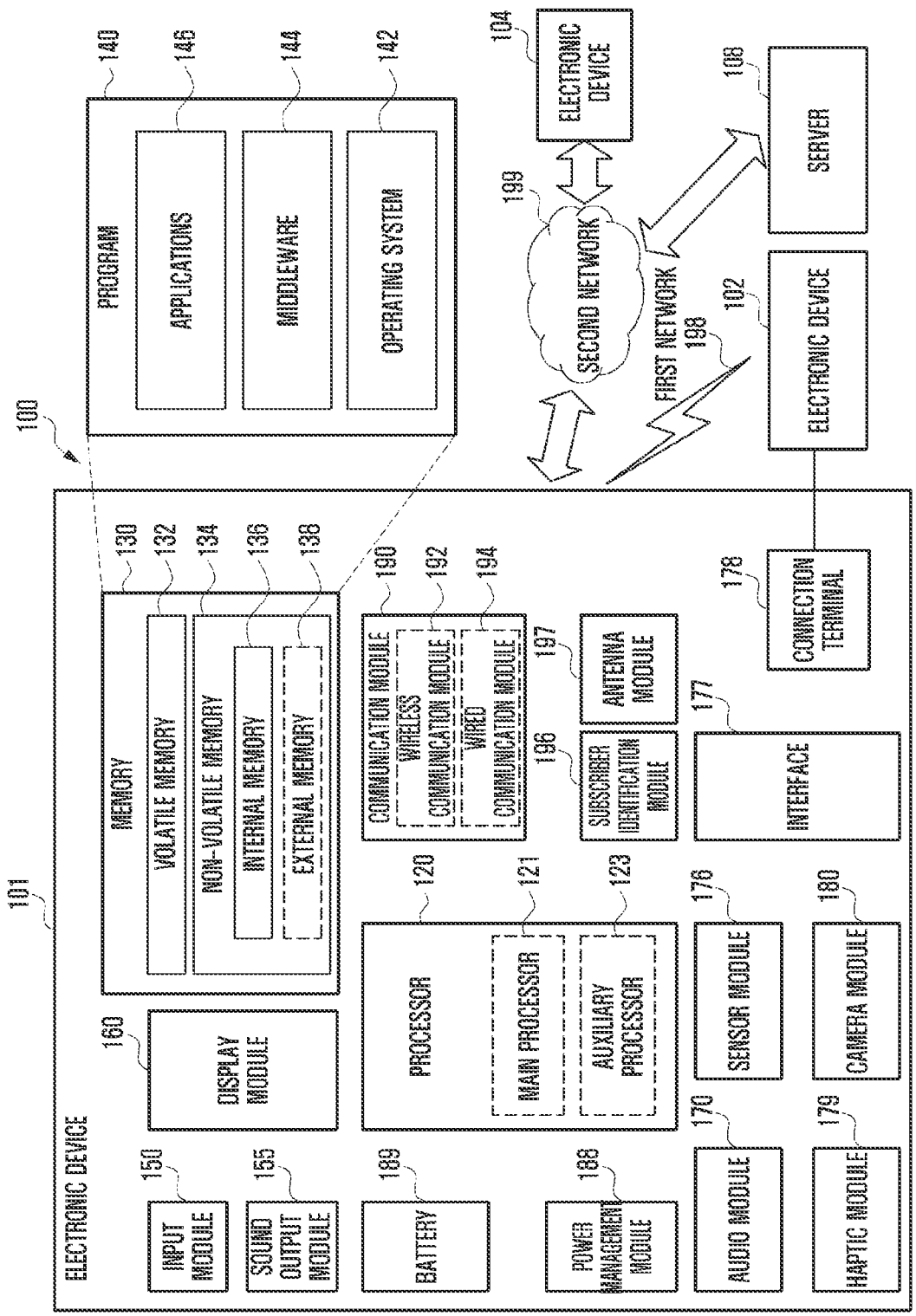
FIG. 1 is a block diagram of an electronic device in a network environment according to an embodiment of the disclosure.

FIG. 1 is a block diagram illustrating an electronic device in a network environment according to an embodiment of the disclosure. Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or applications 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 millisecond (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 and 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it denotes that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
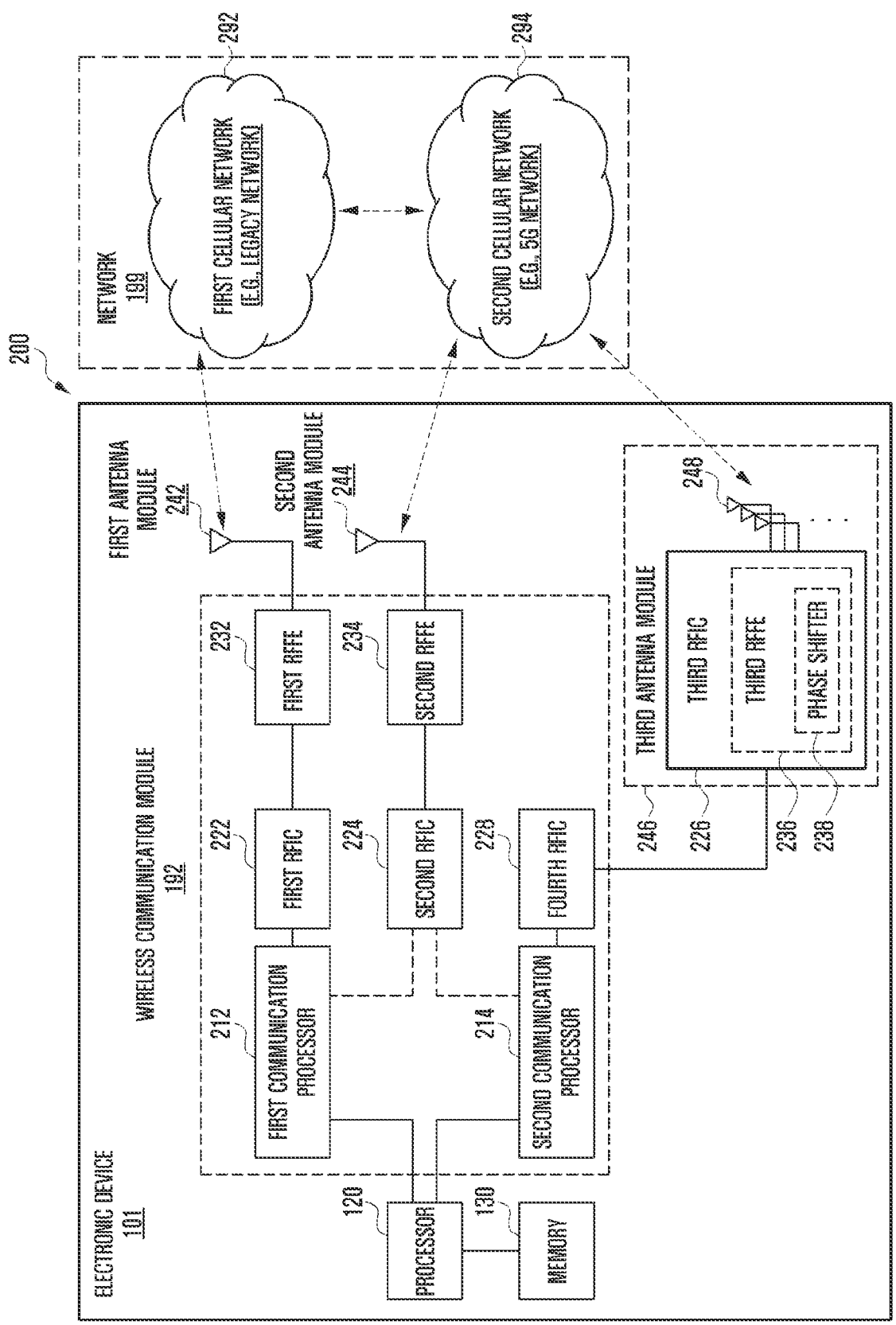
FIG. 2 is a block diagram of an electronic device for supporting legacy network communication and 5G network communication according to an embodiment of the disclosure.

FIG. 2 is a block diagram illustrating an example configuration of an electronic device supporting legacy network communication and 5G network communication according to an embodiment of the disclosure.

Referring to FIG. 2, according to various embodiments, block diagram 200 illustrates that the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may include the processor 120 and the memory 130. The second network 199 may include a first network 292 and a second network 294. According to an embodiment, the electronic device 101 may further include at least one component among the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may be at least a part of the wireless communication module 192. According to an embodiment, the fourth RFIC 228 may be omitted, or may be included as a part of the third RFIC 226.

The first communication processor 212 may establish a communication channel of a band to be used for wireless communication with the first network 292, and may support legacy network communication via the established communication channel. According to an embodiment, the first network may be a legacy network including second generation (2G), third generation (3G), fourth generation (4G), or long-term evolution (LTE) network. The second communication processor 214 may establish a communication channel corresponding to a designated band (e.g., approximately 6 gigahertz (GHz) to 60 GHz) among bands to be used for wireless communication with the second network 294, and may support 5G network communication via the established communication channel. According to an embodiment, the second network 294 may be a 5G network (e.g., new radio (NR)) defined in $3^{rd}$ generation partnership project (3GPP). In addition, according to an embodiment, the first communication processor 212 or the second communication processor 214 may establish a communication channel corresponding to another designated band (e.g., approximately 6 GHz or less) among bands to be used for wireless communication with the second network 294, and may support 5G network communication via the established communication channel. According to an embodiment, the first communication processor 212 and the second communication processor 214 may be implemented in a single chip or a single package. According to an embodiment, the first communication processor 212 or the second communication processor 214 may be implemented in a single chip or a single package, together with the processor 120, the auxiliary processor 123, or the communication module 190.

In the case of transmission, the first RFIC 222 may convert a baseband signal generated by the first communication processor 212 into a radio frequency (RF) signal in the range of approximately 700 megahertz (MHz) to 3 GHz, which is used in the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal into a baseband signal so that the baseband signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal)

in an Sub6 band (e.g., approximately 6 GHz or less) used in the second network 294 (e.g., a 5G network). In the case of reception, a 5G Sub6 RF signal may be obtained from the second network 294 (e.g., a 5G network) via an antenna (e.g., the second antenna module 244), and may be preprocessed by an RFFE (e.g., the second RFFE 234). The second RFIC 224 may convert the preprocessed 5G Sub6 RF signal into a baseband signal so that the signal may be processed by a corresponding communication processor among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used in the second network 294 (e.g., a 5G network). In the case of reception, a 5G Above6 RF signal is obtained from the second network 294 (e.g., a 5G network) via an antenna (e.g., the antenna 248), and may be preprocessed by a third RFFE 236. The third RFIC 226 may convert the preprocessed 5G Above6 RF signal into a baseband signal so that the signal is processed by the second communication processor 214. According to an embodiment, the third RFFE 236 may be implemented as a part of the third RFIC 226.

According to an embodiment, the electronic device 101 may include the fourth RFIC 228, separately from or, as a part of, the third RFIC 226. In this instance, the fourth RFIC 228 may convert a baseband signal produced by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal into a 5G Above6 RF signal. In the case of reception, a 5G Above6 RF signal may be received from the second network 294 (e.g., a 5G network) via an antenna (e.g., the antenna 248), and may be converted into an IF signal by the third RFIC 226. The fourth RFIC 228 may convert the IF signal into a baseband signal so that the second communication processor 214 is capable of processing the baseband signal.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or single package. According to an embodiment, at least one of the first antenna module 242 or the second antenna module 244 may be omitted or may be combined with another antenna module, to process RF signals of a plurality of corresponding bands.

According to an embodiment, the third RFIC 226 and the antenna 248 may be disposed in the same substrate, and may form a third antenna module 246. For example, the wireless communication module 192 or the processor 120 may be disposed in a first substrate (e.g., a main PCB). In this instance, the third RFIC 226 is disposed in a part (e.g., a lower part) of a second substrate (e.g., a sub PCB) different from the first substrate, and the antenna 248 is disposed in another part (e.g., an upper part), so that the third antenna module 246 may be formed. By disposing the third RFIC 226 and the antenna 248 in the same substrate, the length of a transmission line therebetween may be reduced. For example, this may reduce a loss (e.g., a diminution) of a high-frequency band signal (e.g., approximately 6 GHz to 60 GHz) used for 5G network communication, the loss being caused by a transmission line. Accordingly, the electronic device 101 may improve the quality or speed of communication with the second network 294 (e.g., a 5G network).

According to an embodiment, the antenna 248 may be implemented as an antenna array including a plurality of antenna elements which may be used for beamforming. In this instance, the third RFIC 226, for example, may include a plurality of phase shifters 238 corresponding to a plurality of antenna elements, as a part of the third RFFE 236. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of a 5G Above6 RF signal received from the outside via a corresponding antenna element into the same or substantially the same phase. This may allow transmission or reception via beamforming between the electronic device 101 and the outside.

The second network 294 (e.g., a 5G network) may operate independently (e.g., Standalone (SA)) from the first network 292 (e.g., a legacy network), or may operate by being connected thereto (e.g., Non-Standalone (NSA)). For example, in the network, only an access network (e.g., 5G radio access network (RAN) or next generation RAN (NG RAN)) may exist, and a core network (e.g., next generation core (NGC)) may not exist. In this instance, the electronic device 101 may access the access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 130, and may be accessed by another component (e.g., the processor 120, the first communication processor 212, or the second communication processor 214).

Figure 3:
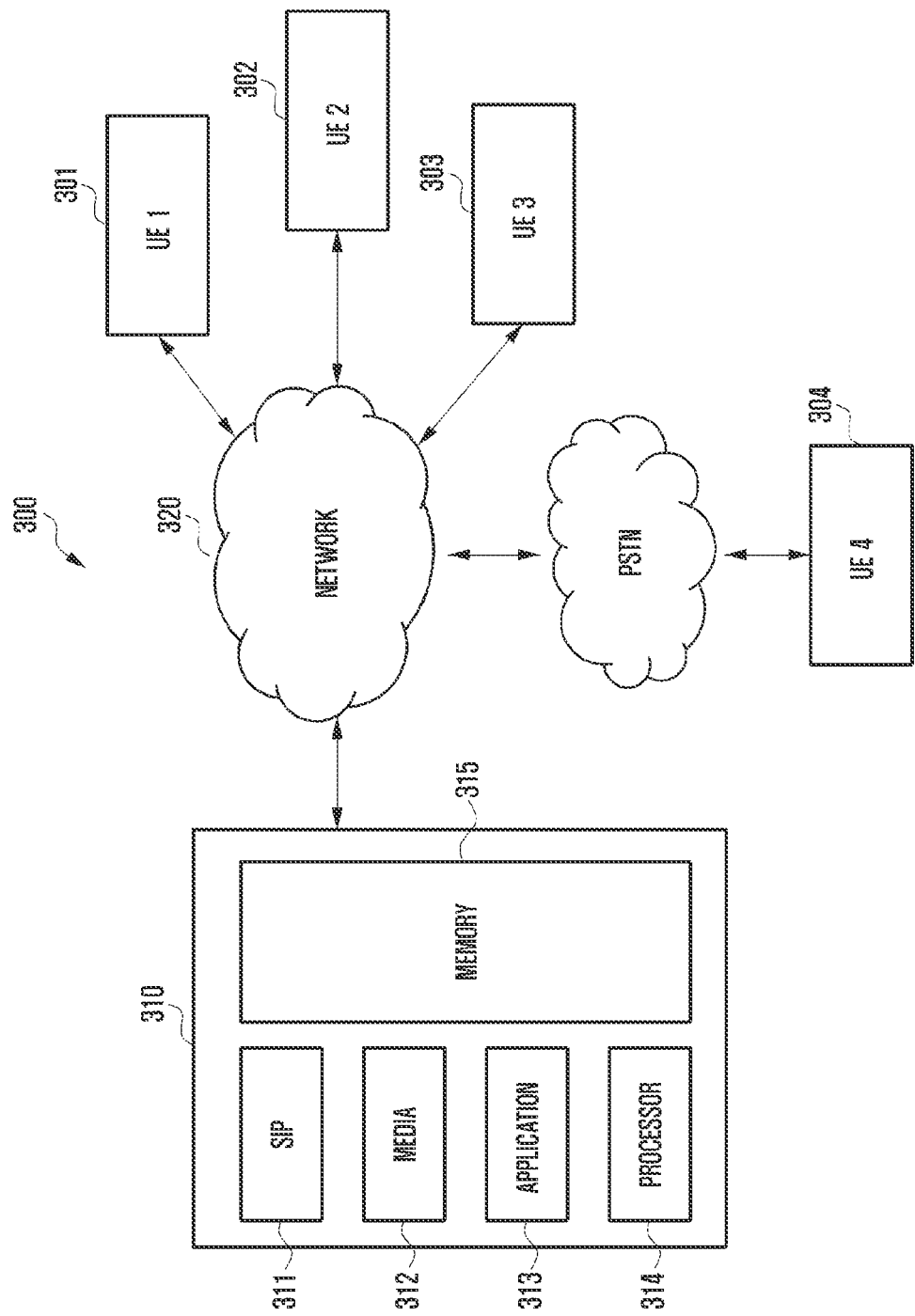
FIG. 3 illustrates a network environment for providing an Internet Protocol (IP) multimedia subsystem (IMS) conference service according to an embodiment of the disclosure.

FIG. 3 illustrates a communication system for providing an IP multimedia subsystem (IMS) conference service according to an embodiment of the disclosure.

Referring to FIG. 3, a communication system 300 may include user equipments (UEs) 301, 302, 303, and 304 (e.g., the electronic device 101 of FIG. 1), an IMS network 320, and an IMS server 310.

According to various embodiments, UEs (e.g., a first UE 301, a second UE 302, a third UE 303, and a fourth UE 304) performing IMS communication (e.g., a voice call, a video call, or file transfer) may be provided with various services by communicating with the IMS server 310 through various channels. For example, the first UE 301, the second UE 302, and/or the third UE 303 (e.g., the electronic device 101 of FIG. 1) may access an Internet protocol (IP)-based data network through an RAN and/or a gateway, and may communicate with the IMS server 310 that controls the IMS network 320 through the IP-based data network. The RAN may include, for example, an access point and a 3G, 4G or 5G base station (or eNodeB) transceiver. The gateway may include, for example, one or more of a mobile switching center (MSC), a packet data serving node (PDSN), a serving GPRS support node (SGSN), a gateway GPRS support node (GGSN), a serving gateway (GWG), and a public data network (PDN) gateway. For example, the fourth UE 304 may access the IMS network 320 through an external wired circuit-switched network, such as a public switched telephone network (PSTN).

According to various embodiments, the IMS server 310 may be positioned inside a core network (e.g., a core network of the first network 292 of FIG. 2 or a core network of the second network 294) or outside the core network (e.g., in the server 108 of FIG. 1), and may support an IMS service.

According to an embodiment, the IMS server 310 may include a session initiation protocol (SIP) server 311, a media server 312, an application server 313, a processor 314, and/or a memory 315. The SIP server 311, the media server 312, and the application server 313 included in the IMS server 310 may be configured to operate as separate server entities that perform respective specialized functions within the IMS server 310, but the embodiments are not limited thereto. The SIP server 311, the media server 312, and the application server 313 may be configured, for example, as functional blocks of the processor 314 in the IMS server 310.

According to an embodiment, the SIP server 311 may perform signaling processing (e.g., initiation, change, and termination of an IMS session between the UEs 301, 302, 303, and/or 304) by transmitting and receiving an SIP message defined in a 3GPP standard to and from the UEs 301, 302, 303, and/or 304. For example, the SIP server 311 may include a proxy call session control function (P-CSCF), an interrogation CSCF (I-CSCF), and a serving CSCF (S-CSCF).

According to an embodiment, the application server 313 may support an application service for a UE, and may include, for example, a telephony application server (TAS), an IP multimedia application server (IM-AS), or a messaging application server (MSG-AS).

According to an embodiment, the media server 312 may process media transmitted and received between UEs of which a session is established by the SIP server 311. For example, the media server 312 may include a multimedia resource function processor (MRFP) including functions of mixing, generating, and processing media, such as a voice and a video, and may support a multiple resource function controller (MRFC) including a function of controlling the MRFP by transmitting and receiving an SIP message to and from another server (e.g., the SIP server 311) in the IMS server 310. The media server 312 may use, for example, a real time transport protocol (RTP) when transmitting processed media to a UE.

According to an embodiment, the memory 315 may be operatively connected to the processor 314, and may store instructions to be executed by the processor 314 and/or processed media. In an embodiment, the SIP server 311, the media server 312, and/or the application server 313 may be devices physically separated from the IMS server 310.

According to an embodiment, a UE (e.g., the first UE 301), which is an initiator, may transmit a request message (e.g., an INVITE message) for IMS conference communication with different UEs (e.g., the second UE 302, the third UE 303, and/or the fourth UE 304) to the IMS server 310. Accordingly, the IMS server 310 may establish a session for a conference call between the first UE 301 and the different UEs.

According to an embodiment, when there is an anonymous device (e.g., the fourth UE 304) among the UEs to be invited to the conference communication, the UE (e.g., the first UE 301) may generate an identification key for a pair of the UE and the anonymous device, and may transmit the identification key to the anonymous device (e.g., the fourth UE 304) before the conference communication is established. Accordingly, the first UE 301 as the initiator and the anonymous fourth UE 304 may share the identification key generated for the pair. Although the fourth UE 304 is described as being anonymous for illustration, the embodiments are not limited thereto, and the first UE 301 as the initiator, the second UE 302, and/or the third UE 303 may anonymously perform a call. For example, a UE (e.g., the first UE 301, the second UE 302, the third UE 303, and/or the fourth UE 304) may establish a call with a phone number thereof hidden, in which case the phone number of the UE is not known to a counterpart and may be displayed as anonymous or unknown. Hereinafter, a UE that establishes a call with a hidden phone number thereof may be referred to as an anonymous UE.

According to an embodiment, the identification key may be generated, for example, using a positive integer. For example, the identification key may be generated by combining positive integers from 11 to 15. The generated identification key may be transmitted to an electronic device participating in a conference via the IMS server 310, for example, through dual-tone multi-frequency (DTMF) signaling.

According to an embodiment, when the first UE 301 needs a private call with the anonymous fourth UE 304 among the UEs participating in the conference communication session while performing the conference communication, the first UE 301 may transmit a separate request message to the UE (e.g., the fourth UE 304) through the IMS server 310. In this case, the first UE 301 may transmit the separation request message including the identification key shared in advance. Accordingly, when receiving the separation request message including the identification key, the anonymous fourth UE 304 may identify the identification key, and may transmit a call request message for generating a private call to the first UE 301.

According to an embodiment, when the UE (e.g., the first UE 301) as the conference initiator is anonymous, the UE may separately generate an identification key for each of the UEs to be invited to the conference communication, and may transmit the identification key to each of the UEs (e.g., the second UE 302, the third UE 303, and the fourth UE 304). Accordingly, a pair of the anonymous first UE 301 as the initiator and each of the different UEs, that is, each of a pair of the first UE 301 and the second UE 302, a pair of the first UE 301 and the third UE 303, and a pair of the first UE 301 and the fourth UE 304, may share a separate identification key generated for each pair.

According to an embodiment, when the first UE 301 as the initiator is anonymous and needs a separate private call with one (e.g., the second UE 302) of the UEs participating in the conference communication session during the conference communication, the first UE 301 may transmit a private call request message to the UE (e.g., the second UE 302) through the IMS server 310. In this case, the first UE 301 may transmit the call request message including the shared identification key to the second UE 302.

According to an embodiment, an electronic device (e.g., the electronic device 101 of FIG. 1 or FIG. 2) may include a communication module (e.g., the communication module 190 of FIG. 1), a memory (e.g., the memory 130 of FIG. 1 or FIG. 2), and a processor (e.g., the processor 120 of FIG. 1 or FIG. 2) operatively connected to the communication module and the memory, wherein the memory may store an instruction, wherein the instruction, when executed, may be configured to cause the processor to identify an occurrence of a conference event for establishing a conference call in which a plurality of external electronic devices participate, identify whether at least one of the plurality of external electronic devices is anonymous, generate an identification key to be mutually shared by a pair of an anonymous electronic device among the plurality of external electronic devices and the electronic device and transmit the identification key to the anonymous electronic device through the communication module when the at least one of the plurality of external electronic devices is anonymous, and generate the conference call in which the plurality of external electronic devices participate.

According to an embodiment, the instruction, when executed, may be configured to cause the processor to identify occurrence of a separation event for generating a private call with one device among the plurality of external electronic devices participating in the conference call, and generate the private call, based on the identification key shared with the one device when the one device is anonymous.

According to an embodiment, the instruction, when executed, may be configured to cause the processor to transmit a message indicating the separation event to the one device when the one device is anonymous, and perform the private call with the one device by accepting the private call when receiving the private call including the identification key from the one device.

According to an embodiment, the instruction, when executed, may be configured to cause the processor to generate and broadcast the message indicating the separation event including the identification key, and accept the private call when receiving the private call including the identification key.

According to an embodiment, the instruction, when executed, may be configured to cause the processor to notify a removal of the one device from the conference call.

According to an embodiment, the instruction, when executed, may be configured to cause the processor to hold the conference call and perform the private call when receiving a notification of a leaving from the conference call from the one device.

According to an embodiment, the instruction, when executed, may be configured to cause the processor to identify whether to re-invite the one device to the conference call when the private call with the one device terminates, and transmit a request for an invitation to the conference call to the one device, based on the identification key shared with the one device when re-inviting the one device.

According to an embodiment, the instruction, when executed, may be configured to cause the processor to identify whether the electronic device is anonymous, generate an identification key to be mutually shared by a pair of the electronic device and each of the plurality of external electronic devices and transmit the generated identification key to each corresponding device among the plurality of external electronic devices through the communication module when the electronic device is anonymous.

According to an embodiment, the instruction, when executed, may be configured to cause the processor to identify occurrence of a separation event for generating a private call with one device among the plurality of external electronic devices participating in the conference call, and generate the private call including the identification key shared with the one device and to make the private call to the one device when the electronic device is anonymous.

According to an embodiment, the instruction, when executed, may be configured to cause the processor to perform the private call when the one device accepts the private call.

Figure 4:
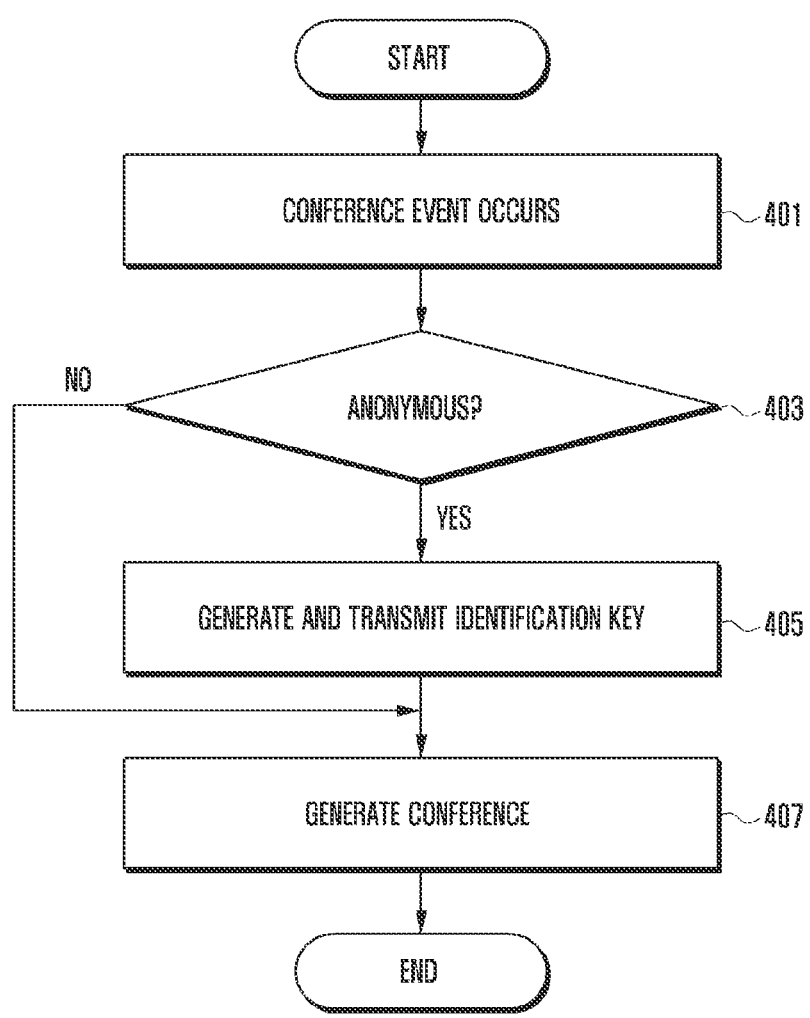
FIG. 4 is a flowchart illustrating a method for providing a conference service according to an embodiment of the disclosure.

FIG. 4 is a flowchart illustrating a method for providing a conference service according to an embodiment of the disclosure.

Referring to FIG. 4, an electronic device (e.g., any one of the first UE 301, the second UE 302, the third UE 303, or the fourth UE 304 of FIG. 3) (e.g., the electronic device 101 of FIG. 1), which is an initiator, may transmit a call request message (e.g., an INVITE message) for an IMS conference call with different electronic devices (e.g., the first UE 301, the second UE 302, the third UE 303, and/or the fourth UE 304) to an IMS server 310. Accordingly, the IMS server 310 may establish a session for the conference call between the electronic device and the different electronic devices. Although an example in which the electronic device 101 as the initiator is the first UE 301 and the different electronic devices to participate in the conference call are the second UE 302, the third UE 303, and/or the fourth UE 304 is described below, the embodiments are not limited thereto. For example, the electronic device 101 as the initiator may be the fourth UE 304, and the different electronic devices to participate in the conference call may be the first UE 301, the second UE 302, and the third UE 303.

According to an embodiment, in operation 401, a processor (e.g., the processor 120 of FIG. 1) of the electronic device 101 may identify that an event of generating a conference occurs.

According to an embodiment, the processor 120 of the electronic device 101 may receive an input to perform a conference call with two or more electronic devices among different electronic device participating in a multi-party call while the electronic device 101 performs the multi-party call with the different electronic devices. For example, the input to perform the conference call may be received by a conference call generation input according to designation of electronic devices to be involved in the conference call through an input module (e.g., the input module 150 of FIG. 1) of the electronic device 101.

According to an embodiment, the processor 120 of the electronic device 101 may identify a list of electronic devices to be involved in the conference call according to occurrence of a conference event. In this case, the processor 120 of the electronic device 101 may transmit the list of electronic devices to be involved in the conference call to the IMS server 310 to generate the conference call. For example, the list of electronic devices to be involved in the conference call may be included in a call request message (e.g., an INVITE message) for the conference call and transmitted to the IMS server 310.

According to an embodiment, the processor 120 of the electronic device 101 may establish the conference call by requesting addition of a participant to an existing call including the conference call. For example, the processor 120 of the electronic device 101 may designate a conference call participant among participants in the multi-party call, and may merge a call with the designated participant into an existing conference call, thereby generating the conference call.

According to an embodiment, in operation 403, the processor 120 of the electronic device 101 may identify whether at least one of two or more electronic devices to participate in the conference call and the electronic device is anonymous in the multi-party call.

According to an embodiment, when at least one of the electronic device 101 and the two or more other electronic devices to participate in the conference call is anonymous, the processor 120 of the electronic device 101 may generate an identification key for a pair of the anonymous electronic device and a counterpart thereof, and may transmit the identification key to the electronic device to participate in operation 405. For example, when one of the two or more other electronic devices to participate in the conference call is anonymous, the processor 120 of the electronic device 101 may generate an identification key for a pair of the electronic device 101 and the anonymous electronic device. For example, when the electronic device 101 is anonymous, the processor 120 of the electronic device 101 may generate an identification key for a pair of the electronic device 101 and each of the two or more other electronic devices to participate in the conference call.

For example, a case where the electronic device 101 as the initiator is the first UE 301 and the other electronic devices to participate in the conference call are the second UE 302, the third UE 303, and the fourth UE 304 is illustrated. When the fourth UE 304 is anonymous, the first UE 301 as the initiator may generate an identification key indicating a pair of the fourth UE 304 and the first UE 301, and may transmit the generated identification key to the fourth UE 304. Accordingly, the first UE 301 as the initiator and the anonymous fourth UE 304 may share the generated identification key.

In another example, a case where the electronic device 101 as the initiator is the first UE 301, the other electronic devices to participate in the conference call are the second UE 302, the third UE 303, and the fourth UE 304, and the first UE 301 as the initiator is anonymous is illustrated. The first UE 301 as the initiator may generate a first identification key for identifying a pair of the first UE 301 and the second UE 302, a second identification key for identifying a pair of the first UE 301 and the third UE 303, and a third identification key for identifying a pair of the first UE 301 and the fourth UE 304, and may transmit the generated first identification key, the generated second identification key, and the generated third identification key to the second UE 302, the third UE 303, and the fourth UE 304, respectively.

According to an embodiment, when there is the anonymous electronic device, the conference call including the other participating electronic devices may be generated through a conference server (e.g., the IMS server 310 of FIG. 3) by generation and transmission of the identification key and a request by the electronic device 101 as the conference call initiator based on the conference event, in operation 407.

Figure 5:
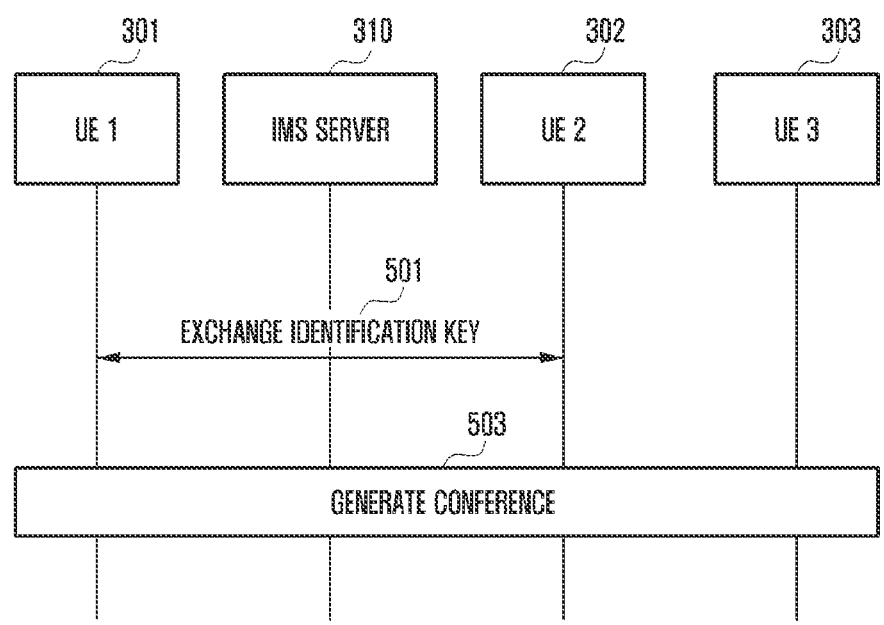
FIG. 5 illustrates a conference call generation operation according to an embodiment of the disclosure.

FIG. 5 illustrates an example of a conference call generation operation according to an embodiment of the disclosure.

Referring to FIG. 5, a first UE (e.g., the first UE 301 of FIG. 3) as an initiator may designate a second UE (e.g., the second UE 302 of FIG. 3) and a third UE (e.g., the third UE 303 of FIG. 3) as conference call participants, and before generating a conference call, for example, when the second UE (e.g., the second UE 302 of FIG. 3) is identified as being anonymous, the first UE may generate an identification key for a pair of the first UE 301 and the second UE 302, and may transmit the generated identification key to the second UE 302 to exchange the identification key, in operation 501.

According to an embodiment, the first UE 301 may transmit the generated identification key, for example, through a session initiation protocol (SIP) message. The generated identification key may be transmitted as being included, for example, in a call-info header field of the SIP message. The first UE 301 may transmit the generated identification key to the second UE 302 directly or through an IMS server (e.g., the IMS server 310 of FIG. 3).

According to an embodiment, after exchanging the identification key with the anonymous second UE 302, the first UE 301 may generate the conference call, in operation 503. For example, when the first UE 301 wants to generate a new conference call, the first UE 301 may transmit a conference invitation request message to the second UE 302 and the third UE 303 as the participants through the IMS server 310, and may receive each acceptance message in response, thus generating the conference call. For example, when performing an existing conference call with electronic devices including the third UE 303, the first UE 301 may transmit a REFER message including call information (e.g., a call-ID) between the first UE 301 and the anonymous second UE 302 to the second UE 302 through the IMS server 310 to invite the second UE 302 to the existing conference call, thereby generating a conference call.

Figure 6:
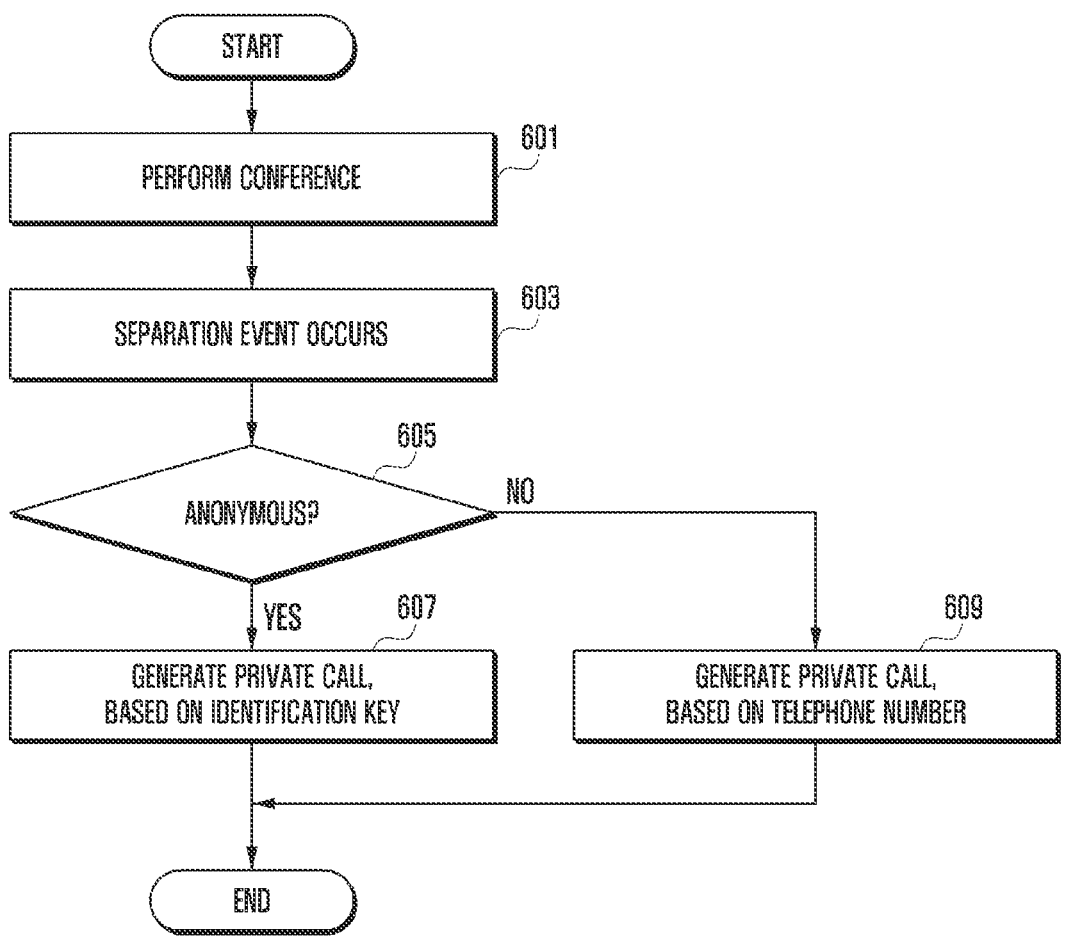
FIG. 6 is an example of a flowchart illustrating a call separation operation during a conference call according to an embodiment of the disclosure.

FIG. 6 is an example of a flowchart illustrating a call separation operation during a conference call according to an embodiment of the disclosure.

According to an embodiment, in operation 601, a processor (e.g., the processor 120 of FIG. 1) of an electronic device (e.g., the electronic device 101 of FIG. 1) may perform a conference call with different electronic devices. For example, the electronic device 101 (e.g., the first UE 301 of FIG. 3) as a conference call initiator may generate and perform the conference call with the different electronic devices (e.g., the second UE 302, the third UE 303, and/or the fourth UE 304 of FIG. 3) as described above with reference to FIG. 4 or 5. Here, the number of conference participants is an example and is not limited thereto, and the conference call may be performed with participation of three or more participants including the initiator.

According to an embodiment, in operation 603, the processor 120 of the electronic device 101 identify an occurrence of a separation event while performing the conference call with the second UE 302, the third UE 303, and the fourth UE 304. For example, the separation event may be identified by the processor 120 of the electronic device 101 designating one (e.g., the second UE 302) of the electronic devices participating in the conference call through an input module (e.g., the input module 150 of FIG. 1) and receiving a separate call input for performing a private call.

According to an embodiment, when the separation event occurs, the processor 120 may identify whether one or more of the electronic device (e.g., the second UE 302) designated to be subject to the separation event or the electronic device 101 as the conference initiator is anonymous, in operation 605.

According to an embodiment, when the electronic device 101 or the electronic device subject to a separate call is identified as being anonymous in operation 605, the processor 120 of the electronic device 101 may generate a private call, based on an identification key shared by a pair of the electronic device 101 and the electronic device subject to the separate call, in operation 607.

According to an embodiment, when the electronic device 101 or the electronic device subject to the separate call is anonymous, the electronic device 101 may transmit a call request message including the identification key to the second UE 302 subject to the separate call. In this case, when the request message is an SIP message, the identification key may be included in a call-info header. Alternatively, the identification key may be transmitted via the IMS server 310 by using a message according to a DTMF event. The second UE 302 receiving the request message as the electronic device subject to the separate call and the electronic device 101 as the initiator may identify a call counterpart by using an existing identification key generated and shared before the conference call.

According to an embodiment, when both the electronic device 101 and the electronic device subject to the separate call are identified as not being anonymous in operation 605, the processor 120 of the electronic device 101 may generate a private call, based on a telephone number of the second UE 302 subject to the separate call, in operation 609.

Figure 7:
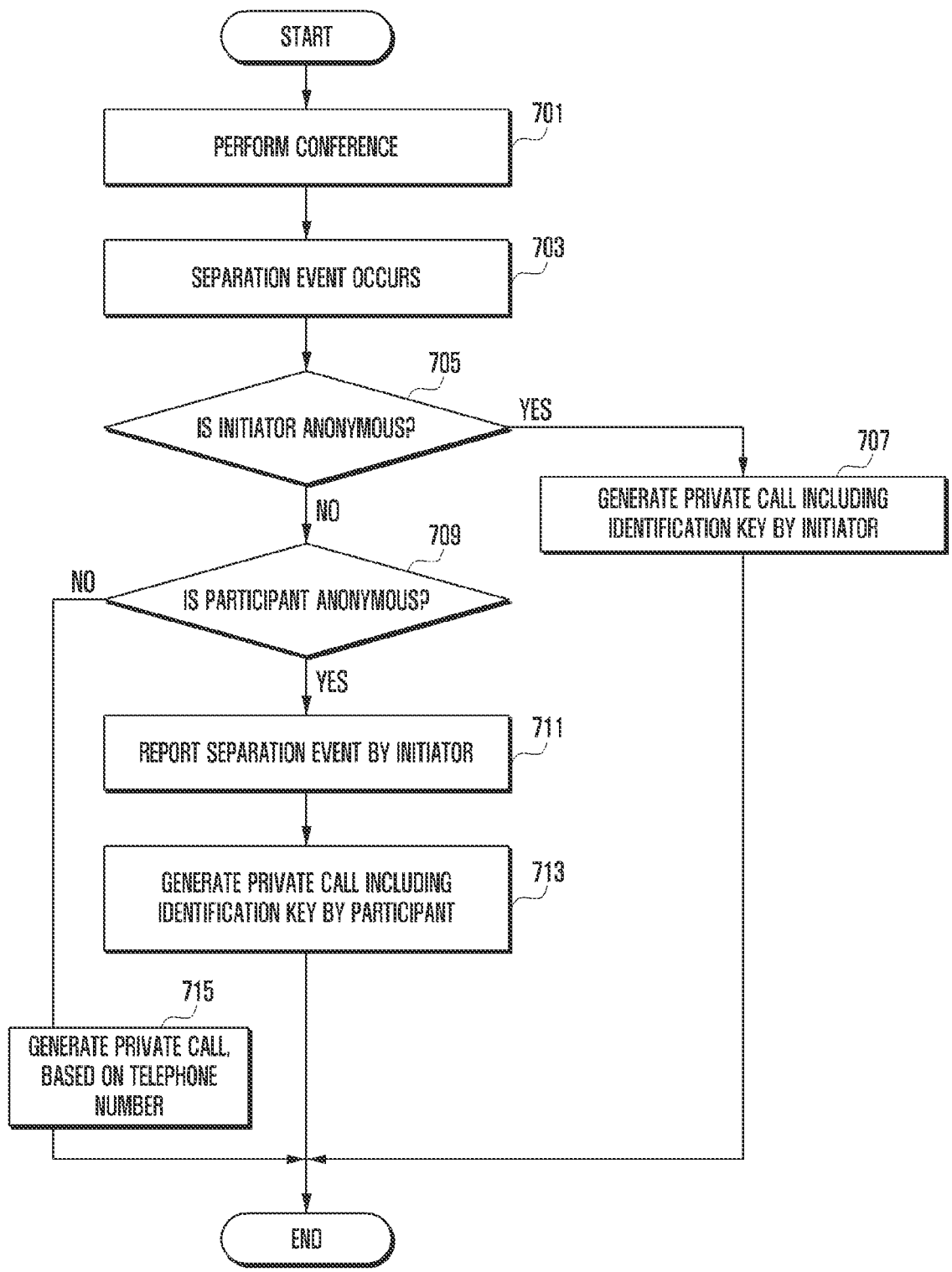
FIG. 7 is another example of a flowchart illustrating a call separation operation during a conference call according to an embodiment of the disclosure.

FIG. 7 is another example of a flowchart illustrating a call separation operation during a conference call according to an embodiment of the disclosure.

According to an embodiment, in operation 701, a processor (e.g., the processor 120 of FIG. 1) of an electronic device (e.g., the electronic device 101 of FIG. 1) may perform a conference call with different electronic devices. For example, the electronic device 101 (e.g., the first UE 301 of FIG. 3) as a conference call initiator may generate and perform the conference call with the different electronic devices (e.g., the second UE 302, the third UE 303, and/or the fourth UE 304 of FIG. 3) as described above with reference to FIG. 4 or 5. Here, the number of conference participants is an example and is not limited thereto, and the conference call may be performed with participation of three or more participants including the initiator.

According to an embodiment, in operation 703, the processor 120 of the electronic device 101 identify occurrence of a separation event while performing the conference call with the second UE 302, the third UE 303, and the fourth UE 304. For example, the separation event may be identified by the processor 120 of the electronic device 101 designating one (e.g., the second UE 302) of the electronic devices participating in the conference call through an input module (e.g., the input module 150 of FIG. 1) and receiving a separate call input for performing a private call.

According to an embodiment, when the separation event occurs, the processor 120 may identify whether one or more of the electronic device (e.g., the second UE 302) designated to be subject to the separation event or the electronic device 101 as the conference initiator is anonymous, in operation 705.

According to an embodiment, when the electronic device 101 as the initiator is identified as being anonymous in operation 705, the processor 120 of the electronic device 101 may generate a private call, based on an identification key shared by a pair of the electronic device 101 and the electronic device subject to the separation event, in operation 707. For example, the processor 120 may generate a private call including the identification key and separate call information, and may make the call to the second UE 302 as the electronic device subject to the separation event. Upon receiving the private call including the identification key, the second UE 302 may compare the included identification key with an existing shared identification key, and may automatically respond to the received private call when the included identification key matches the existing shared identification key.

According to an embodiment, when the initiator is not anonymous, the processor 120 may identify whether the electronic device (e.g., the second UE 302) designated to be subject to the separation event is anonymous, in operation 709.

According to an embodiment, when the second UE 302 participating in the conference call, which is the electronic device to be separated, is anonymous, the processor 120 may transmit a request message including the separate call information to the second UE 302, for example, via a DTMF notification, to report the separation event, in operation 711, thereby requesting generation of a new private call separated from the conference call.

According to an embodiment, upon receiving the separate call request message, the second UE 302 may generate a private call, based on the identification key and the separate call information, in operation 713. For example, the second UE 302 may identify that the notification received through DTMF is received from the electronic device 101 as the initiator. Upon receiving the notification, the second UE 302 may generate a private call including the identification key shared with the conference initiator and the separate call information, and may make the private call to the electronic device 101 as the conference initiator. The electronic device 101 may compare the identification key included in the received private call with the existing shared identification key, and may automatically respond to the received private call when the included identification key matches the existing shared identification key.

According to an embodiment, when both the electronic device 101 and the electronic device subject to a separate call are identified as not being anonymous, the processor 120 of the electronic device 101 may generate a private call, based on a telephone number of the second UE 302 subject to the separate call, in operation 715.

Figure 8:
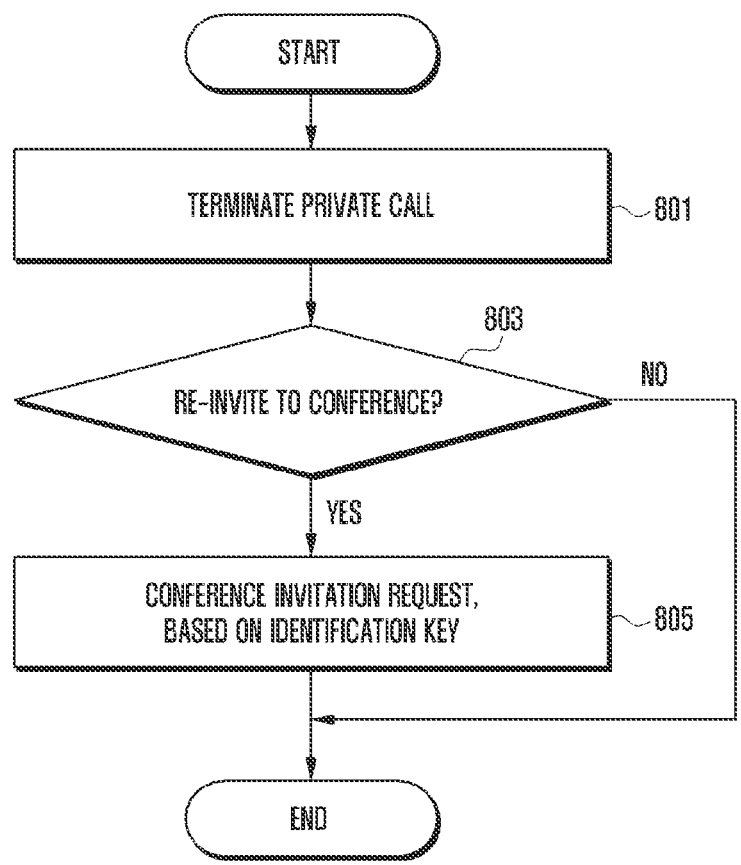
FIG. 8 is a flowchart illustrating a conference re-invitation operation after call separation according to an embodiment of the disclosure.

FIG. 8 is a flowchart illustrating a conference re-invitation operation after call separation according to an embodiment of the disclosure.

Referring to FIG. 8, in operation 801, a processor (e.g., the processor 120 of FIG. 1) of an electronic device (e.g., the electronic device 101 of FIG. 1) (e.g., the first UE 301 of FIG. 3) may terminate a private call. For example, while generating and performing a conference call with different electronic devices (e.g., the second UE 302, the third UE 303, and the fourth UE 304 of FIG. 3) as described above with reference to FIG. 6 or 7, the electronic device 101 (e.g., the first UE 301 of FIG. 3) as a conference call initiator may generate a private call with a second UE 302 to perform a separate call from the conference call, and may then terminate the private call.

According to an embodiment, in operation 803, the processor 120 of the electronic device 101 may determine whether to re-invite the second UE 302 to the previous conference call after terminating the private call.

According to an embodiment, when determining to re-invite the second UE 302 to the previous conference call after terminating the private call, the processor 120 of the electronic device 101 may transmit a conference invitation request to the second UE 302, based on an existing identification key shared with the second UE 302, in operation 805.

According to an embodiment, when determining not to re-invite the second UE 302 to the previous conference call after terminating the private call, the processor 120 of the electronic device 101 may return to the conference call without an additional operation for the second UE 302 after terminating the private call.

Figure 9:
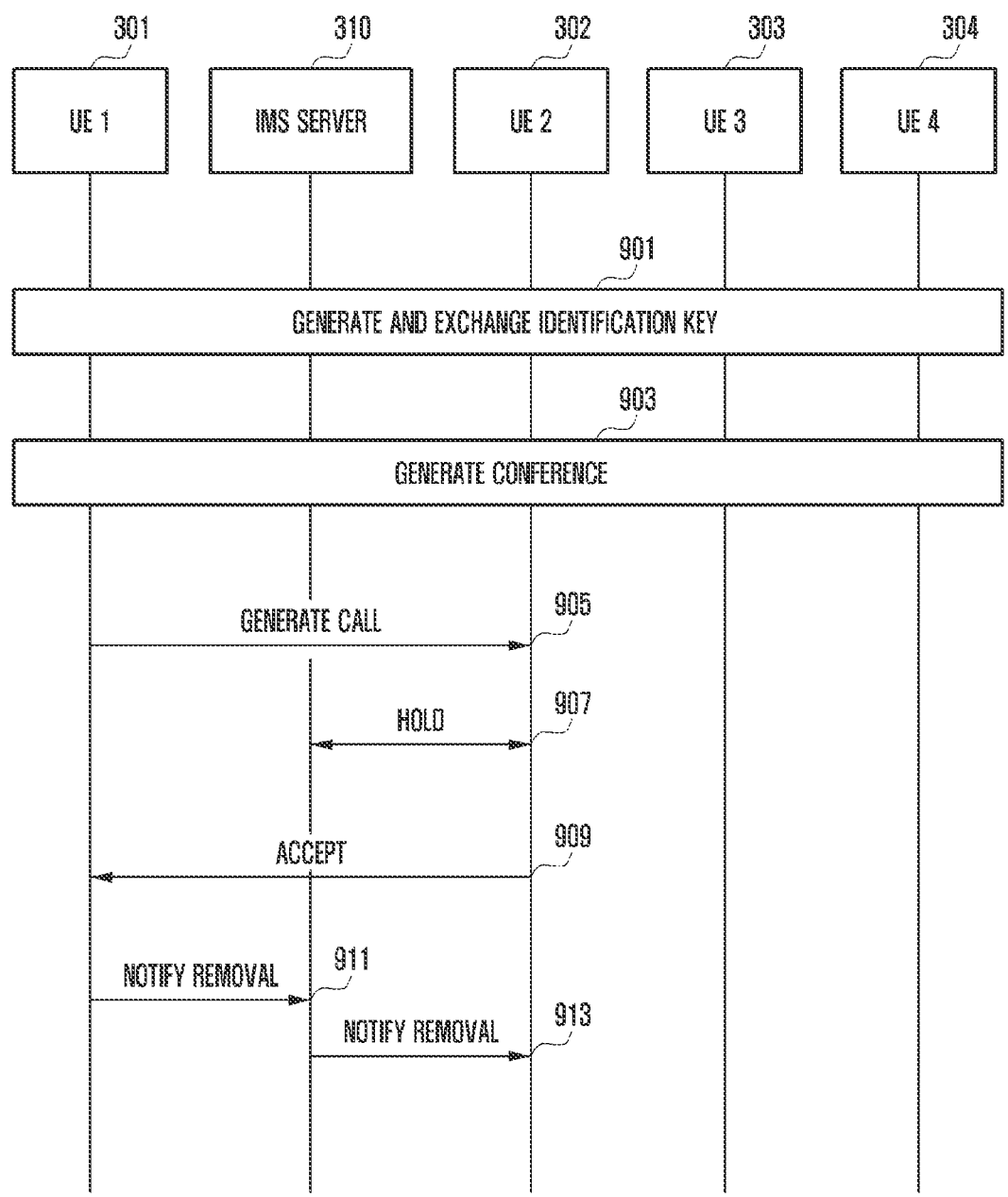
FIG. 9 illustrates an example of a conference call and a call separation operation according to an embodiment of the disclosure.

FIG. 9 illustrates an example of a conference call and a call separation operation according to an embodiment of the disclosure.

Referring to FIG. 9, a first UE (e.g., the first UE 301 of FIG. 3) (e.g., the electronic device 101 of FIG. 1) as a conference call initiator may designate a second UE (e.g., the second UE 302 of FIG. 3), a third UE (e.g., the third UE 303 of FIG. 3), and a fourth UE (e.g., the fourth UE 304 of FIG. 3) as conference call participants, and may generate a conference call.

According to an embodiment, before generating the conference call, for example, when the first UE 301 as the conference call initiator is identified as being anonymous, the first UE 301 may generate an identification key for a pair of the first UE 301 and each of the second UE 302, the third UE 303, and the fourth UE 304, and may transmit the generated identification key to each of the second UE 302, the third UE 303, and the fourth UE 304 to exchange and share the identification key by each pair, in operation 901.

According to an embodiment, the first UE 301 may transmit the generated identification key, for example, through a session initiation protocol (SIP) message. The generated identification key may be transmitted as being included, for example, in a call-info header field of the SIP message. The first UE 301 may transmit the generated identification key to each of the second UE 302, the third UE 303, and the fourth UE 304 directly or through an IMS server (e.g., the IMS server 310 of FIG. 3).

According to an embodiment, after exchanging the identification key with the second UE 302, the third UE 303, and the fourth UE 304, the anonymous first UE 301 may generate the conference call, in operation 903. For example, when the first UE 301 wants to generate a new conference call, the first UE 301 may transmit a conference invitation request message to the second UE 302, the third UE 303, and the fourth UE 304 as the participants through the IMS server 310, and may receive each acceptance message in response, thus generating the conference call. For example, when performing an existing conference call with electronic devices including the third UE 303 and the fourth UE 304, the first UE 301 may transmit a REFER message including call information (e.g., a call-ID) between the anonymous first UE 301 and the second UE 302 to the second UE 302 through the IMS server 310 to invite the second UE 302 to the existing conference call, thereby generating a conference call.

According to an embodiment, while performing the conference call with the second UE 302, the third UE 303, and the fourth UE 304, when a separation event occurs, for example, due to an input for a private call with the second UE 302, the first UE 301 may transmit a call request message (e.g., an INVITE message) including the identification key shared by the pair of the first UE 301 and the second UE 302 and separate call information to the second UE 302 designated to be subject to the separation event, thereby generating the private call, in operation 905.

According to an embodiment, upon detecting the call request message transmitted from the first UE 301, when the identification keys are identified as being the same, the second UE 302 may hold an ongoing conference call session, in operation 907, and may accept a call request from the first UE 301, in operation 909, thereby establishing a new private call between the first UE 301 and the second UE 302.

According to an embodiment, when the new private call with the second UE 302 is established, the first UE 301 may transmit a removal notification message for removing the second UE 302 from the existing conference call to the IMS server (e.g., the IMS server 310 of FIG. 3), in operation 911, and the IMS server 310 may transmit the removal notification message to the second UE 302, in operation 913, thereby removing the second UE 302 from the conference call.

Figure 10:
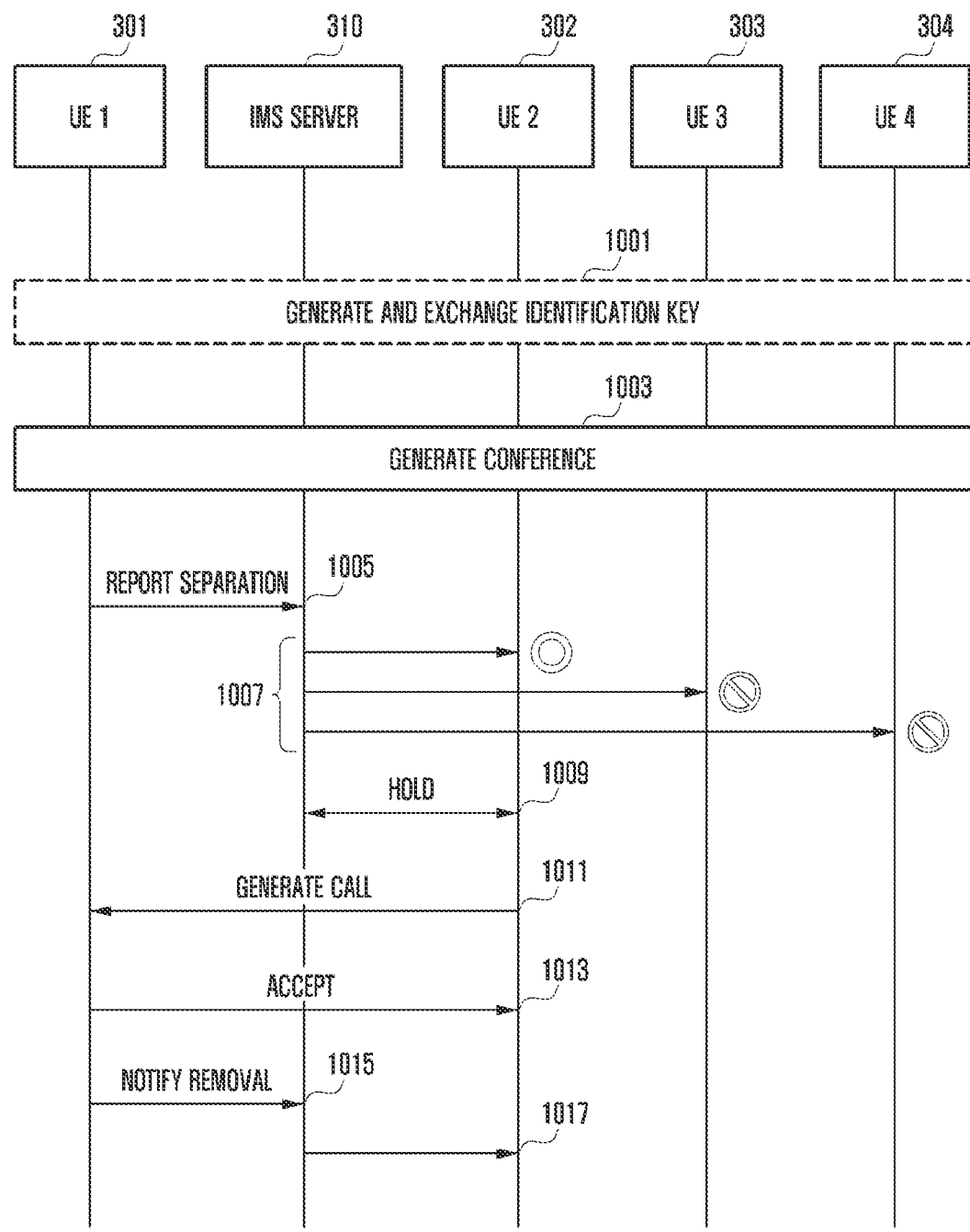
FIG. 10 illustrates another example of a conference call and a call separation operation according to an embodiment of the disclosure.

FIG. 10 illustrates another example of a conference call and a call separation operation according to an embodiment of the disclosure.

Referring to FIG. 10, a first UE (e.g., the first UE 301 of FIG. 3) (e.g., the electronic device 101 of FIG. 1) as a conference call initiator may designate a second UE (e.g., the second UE 302 of FIG. 3), a third UE (e.g., the third UE 303 of FIG. 3), and a fourth UE (e.g., the fourth UE 304 of FIG. 3) as conference call participants, and may generate a conference call.

According to an embodiment, before generating the conference call, for example, when the second UE 302 is identified as being anonymous, the first UE 301 may generate an identification key for a pair of the first UE 301 and the second UE 302, and may transmit the generated identification key to the second UE 302 to exchange the identification key, in operation 1001. The identification key may be generated as a positive integer by combining positive integers, for example, from 11 to 15, in which case the identification key may be transmitted through DRMF but may not be input through a telephone keypad.

According to an embodiment, the first UE 301 may transmit the generated identification key, for example, through a session initiation protocol (SIP) message. The generated identification key may be transmitted as being included, for example, in a call-info header field of the SIP message. The first UE 301 may transmit the generated identification key to the second UE 302 directly or through an IMS server (e.g., the IMS server 310 of FIG. 3).

According to an embodiment, after exchanging the identification key with the anonymous second UE 302, the first UE 301 may generate the conference call, in operation 1003.

According to an embodiment, while performing the conference call with the second UE 302, the third UE 303, and the fourth UE 304, when a separation event occurs, for example, due to an input for a private call with the second UE 302, the first UE 301 may transmit a separation notification message including the identification key shared with the second UE 302 to the IMS server 310, for example, through DTMF, in operation 1005.

According to an embodiment, upon receiving the separation notification message, the IMS server 310 may broadcast the received separation notification message to all conference participants, in operation 1007.

According to an embodiment, the conference participants may extract the identification key from the received separation notification message, and the second UE 302 may identify that the identification key is the same as the identification key shared by the second UE 302. However, the third UE 303 and the fourth UE 304 extract the identification key from the separation notification message but discard the identification key as meaningless information.

According to an embodiment, the second UE 302 detecting the same identification key as the shared identification key from a call request message received from the first UE 301 via the IMS server 310 may hold an ongoing conference call session, in operation 1009, and may generate and make a new call to the first UE 301, in operation 1011, and the first UE 301 may accept the made call, in operation 1013, thereby establishing the new private call between the first UE 301 and the second UE 302.

According to an embodiment, when the new private call with the second UE 302 is established, the first UE 301 may transmit a removal notification message for removing the second UE 302 from the existing conference call to the IMS server 310, in operation 1015, and the IMS server 310 may transmit the removal notification message to the second UE 302, in operation 1017, thereby removing the second UE 302 from the conference call.

Figure 11:
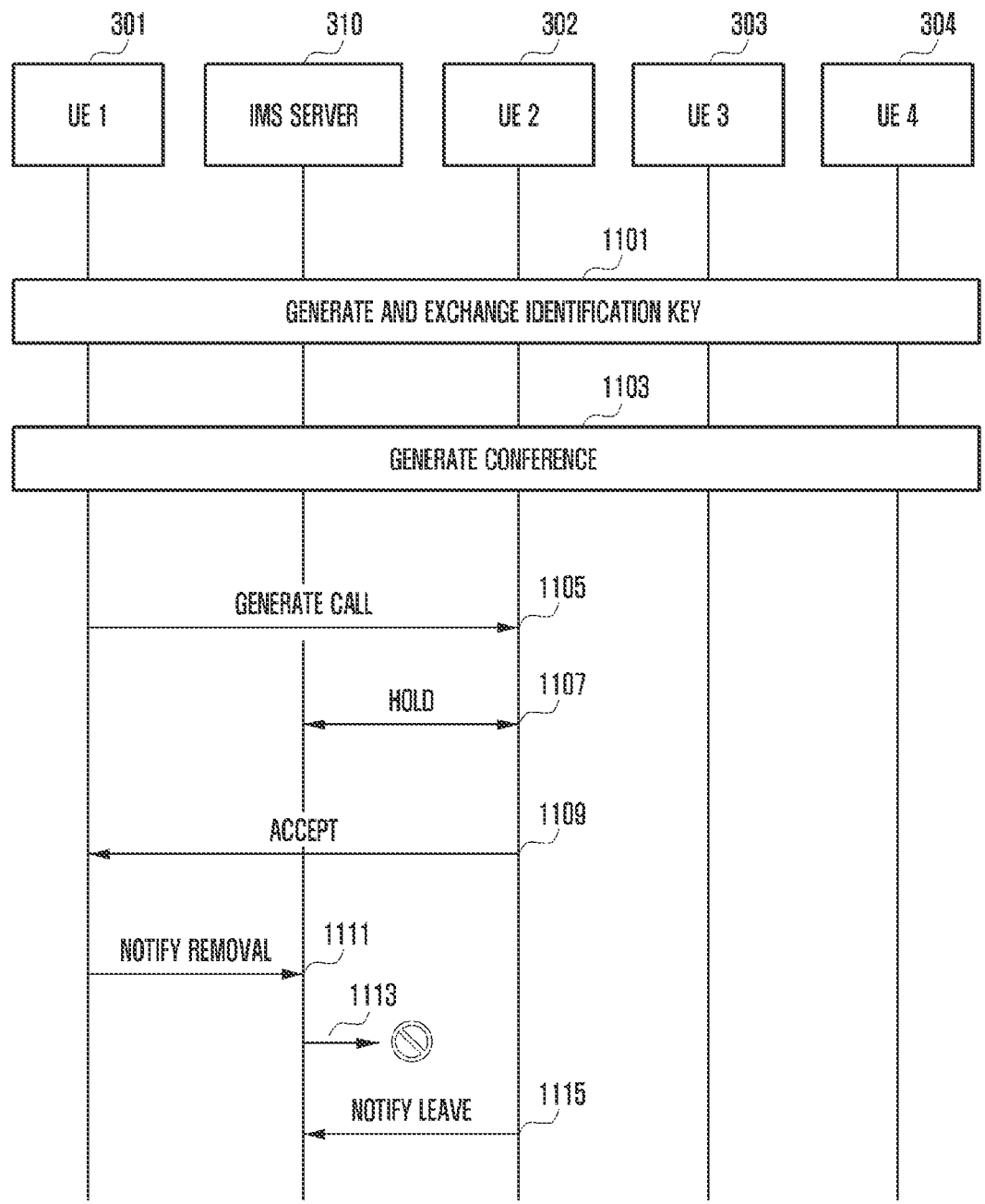
FIG. 11 illustrates still another example of a conference call and a call separation operation according to an embodiment of the disclosure.

FIG. 11 illustrates still another example of a conference call and a call separation operation according to an embodiment of the disclosure.

Operations 901, 903, 905, 907, 909, and 911 or operations 1001, 1003, 1005, 1007, 1009, 1011, 1013, and 1015 of the embodiments described with reference to FIG. 9 or 10 may be performed identically or similarly in FIG. 11, and a redundant description may be omitted below.

Referring to FIG. 11, a first UE (e.g., the first UE 301 of FIG. 3) (e.g., the electronic device 101 of FIG. 1) as a conference call initiator may designate a second UE (e.g., the second UE 302 of FIG. 3), a third UE (e.g., the third UE 303 of FIG. 3), and a fourth UE (e.g., the fourth UE 304 of FIG. 3) as conference call participants, and may generate a conference call.

According to an embodiment, before generating the conference call, for example, when the first UE 301 as the conference call initiator or at least one of the conference participants is identified as being anonymous, the first UE 301 may generate an identification key for each of at least one pair among pairs of the first UE 301 and each of the second UE 302, the third UE 303, and the fourth UE 304, and may transmit the generated identification key to each of the second UE 302, the third UE 303, and/or the fourth UE 304 to exchange and share the identification key by the at least one pair, in operation 1101.

According to an embodiment, the first UE 301 may transmit the generated identification key, for example, through a session initiation protocol (SIP) message. The generated identification key may be transmitted as being included, for example, in a call-info header field of the SIP message. The first UE 301 may transmit the generated identification key to each of the second UE 302, the third UE 303, and/or the fourth UE 304 directly or through an IMS server (e.g., the IMS server 310 of FIG. 3).

According to an embodiment, after exchanging the identification key with the second UE 302, the third UE 303, and/or the fourth UE 304, the first UE 301 may generate the conference call, in operation 1103. For example, when the first UE 301 wants to generate a new conference call, the first UE 301 may transmit a conference invitation request message to the second UE 302, the third UE 303, and the fourth UE 304 as the participants through the IMS server 310, and may receive each acceptance message in response, thus generating the conference call. For example, when performing an existing conference call with electronic devices including the third UE 303 and the fourth UE 304, the first UE 301 may transmit a REFER message including call information (e.g., a call-ID) between the first UE 301 and the anonymous second UE 302 to the second UE 302 through the IMS server 310 to invite the second UE 302 to the existing conference call, thereby generating a conference call.

According to an embodiment, while performing the conference call with the second UE 302, the third UE 303, and the fourth UE 304, when a separation event occurs, for example, due to an input for a private call with the second UE 302, the first UE 301 may transmit a call request message (e.g., an INVITE message) including the identification key shared by the pair of the first UE 301 and the second UE 302 and separate call information to the second UE 302 designated to be subject to the separation event, thereby generating the private call, in operation 1105.

According to an embodiment, upon detecting the call request message transmitted from the first UE 301, when the identification keys are identified as being the same, the second UE 302 may hold an ongoing conference call session, in operation 1107.

According to an embodiment, the second UE 302 may accept a call request from the first UE 301, in operation 1109, thereby establishing a new private call between the first UE 301 and the second UE 302.

According to an embodiment, when the new private call with the second UE 302 is established, the first UE 301 may transmit a removal notification message for removing the second UE 302 from the existing conference call to the IMS server (e.g., the IMS server 310 of FIG. 3), in operation 1111. The IMS server 310 may transmit the removal notification message to the second UE 302, in operation 1113.

However, when a removal notification from the IMS server 310 does not reach the second UE 302 and is lost or not properly received, the second UE 302 may transmit a leave notification to the IMS server 310, in operation 1115, thereby being autonomously removed from the conference call.

Figure 12:
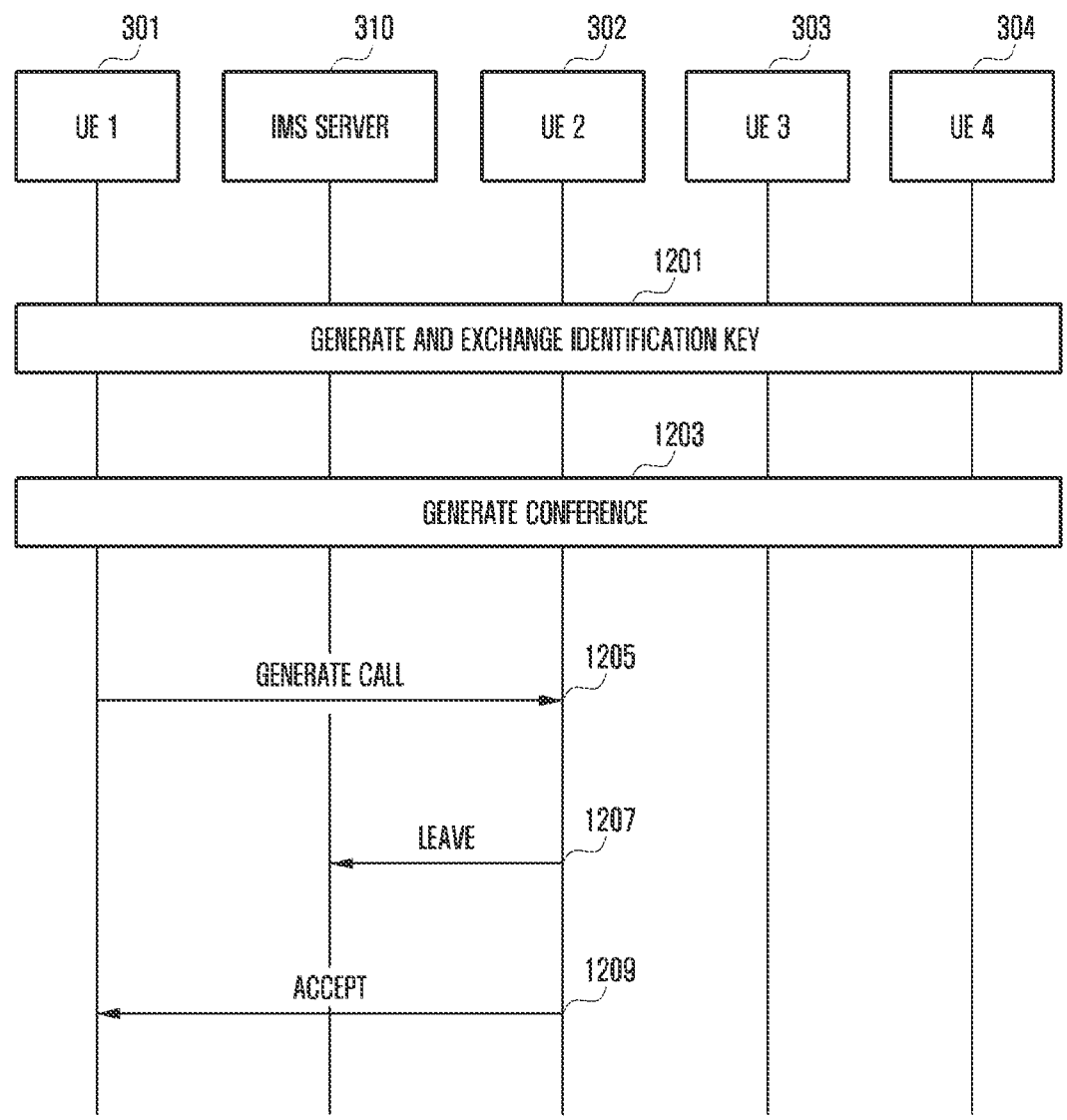
FIG. 12 illustrates yet another example of a conference call and a call separation operation according to an embodiment of the disclosure.

FIG. 12 illustrates still another example of a conference call and a call separation operation according to an embodiment of the disclosure.

Operations 901, 903, 905, 907, 909, and 911, operations 1001, 1003, 1005, 1007, 1009, 1011, 1013, and 1015, or operations 1101, 1103, and 1105 of the embodiments described with reference to FIGS. 9 to 11 may be performed identically or similarly in FIG. 12, and a redundant description may be omitted below.

Referring to FIG. 12, a first UE (e.g., the first UE 301 of FIG. 3) (e.g., the electronic device 101 of FIG. 1) as a conference call initiator may designate a second UE (e.g., the second UE 302 of FIG. 3), a third UE (e.g., the third UE 303 of FIG. 3), and a fourth UE (e.g., the fourth UE 304 of FIG. 3) as conference call participants, and may generate a conference call.

According to an embodiment, before generating the conference call, for example, when the first UE 301 as the conference call initiator or at least one of the conference participants is identified as being anonymous, the first UE 301 may generate an identification key for each of at least one pair among pairs of the first UE 301 and each of the second UE 302, the third UE 303, and the fourth UE 304, and may transmit the generated identification key to each of the second UE 302, the third UE 303, and/or the fourth UE 304 to exchange and share the identification key by the at least one pair, in operation 1201.

According to an embodiment, the first UE 301 may transmit the generated identification key, for example, through a session initiation protocol (SIP) message. The generated identification key may be transmitted as being included, for example, in a call-info header field of the SIP message. The first UE 301 may transmit the generated identification key to each of the second UE 302, the third UE 303, and/or the fourth UE 304 directly or through an IMS server (e.g., the IMS server 310 of FIG. 3).

According to an embodiment, after exchanging the identification key with the second UE 302, the third UE 303, and/or the fourth UE 304, the first UE 301 may generate the conference call, in operation 1203. For example, when the first UE 301 wants to generate a new conference call, the first UE 301 may transmit a conference invitation request message to the second UE 302, the third UE 303, and the fourth UE 304 as the participants through the IMS server 310, and may receive each acceptance message in response, thus generating the conference call. For example, when performing an existing conference call with electronic devices including the third UE 303 and the fourth UE 304, the first UE 301 may transmit a REFER message including call information (e.g., a call-ID) between the first UE 301 and the anonymous second UE 302 to the second UE 302 through the IMS server 310 to invite the second UE 302 to the existing conference call, thereby generating a conference call.

According to an embodiment, while performing the conference call with the second UE 302, the third UE 303, and the fourth UE 304, when a separation event occurs, for example, due to an input for a private call with the second UE 302, the first UE 301 may transmit a call request message (e.g., an INVITE message) including the identification key shared by the pair of the first UE 301 and the second UE 302 and separate call information to the second UE 302 designated to be subject to the separation event, thereby generating the private call, in operation 1205.

According to an embodiment, upon detecting the call request message transmitted from the first UE 301, the second UE 302 may notify the IMS server 310 that the second UE 302 leaves an ongoing conference call session, in operation 1207. When the identification keys are identified as being the same, the second UE 302 may be configured to perform automatic leaving, thereby avoiding holding the conference call.

According to an embodiment, the second UE 302 may accept a call request from the first UE 301, in operation 1209, thereby establishing a new private call between the first UE 301 and the second UE 302.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   communication circuitry;
   a processor; and
   a memory storing instructions which, when executed by the processor, cause the processor to:
   identify an occurrence of a conference event for establishing a conference call in which a plurality of external electronic devices participate,
   identify whether at least one of the plurality of external electronic devices is anonymous,
   based on identifying that the at least one of the plurality of external electronic devices is anonymous, generate an identification key to be mutually shared by an anonymous electronic device among the plurality of external electronic devices and the electronic device and transmit the identification key to the anonymous electronic device through the communication circuitry,
   generate the conference call in which the plurality of external electronic devices participate,
   identify an occurrence of a separation event for generating a private call with one device among the plurality of external electronic devices participating in the conference call, and
   based on the identification key shared with the one device after identifying that the one device is anonymous, generate the private call.

2. The electronic device of claim 1, wherein the instructions, when executed by the processor, further cause the processor to:
   based on identifying that the one device is anonymous, transmit a message indicating the separation event to the one device, and
   in response to receiving the private call comprising the identification key from the one device, perform the private call with the one device by accepting the private call.

3. The electronic device of claim 2, wherein the instructions, when executed by the processor, further cause the processor to:
   generate and broadcast the message indicating the separation event, the message comprising the identification key, and
   in response to receiving the private call comprising the identification key, accept the private call.

4. The electronic device of claim 1, wherein the instructions, when executed by the processor, further cause the processor to:
   notify the plurality of external electronic devices participating in the conference call that the one device has been removed from the conference call.

5. The electronic device of claim 1, wherein the instructions, when executed by the processor, further cause the processor to:
   in response to receiving an indication from the one device that the one device is leaving the conference call, hold the conference call and perform the private call.

6. The electronic device of claim 1, wherein the instructions, when executed by the processor, further cause the processor to:
   in response to the private call with the one device terminating, identify whether to re-invite the one device to the conference call, and
   based on the identification key shared with the one device when re-inviting the one device, transmit, to the one device, a request for an invitation to the conference call.

7. The electronic device of claim 1, wherein the instructions, when executed by the processor, further cause the processor to:
   identify whether the electronic device itself is anonymous,
   based on identifying that the electronic device itself is anonymous, generate the identification key to be mutually shared by a pair of the electronic device and each of the plurality of external electronic devices, respectively, and transmit, through the communication circuitry, the identification key to each corresponding device among the plurality of external electronic devices.

8. The electronic device of claim 7, wherein the instructions, when executed by the processor, further cause the processor to:
   identify the occurrence of the separation event for generating the private call with the one device among the plurality of external electronic devices participating in the conference call, and
   based on identifying that the electronic device itself is anonymous, generate the private call comprising the identification key shared with the one device and transmit the private call to the one device.

9. The electronic device of claim 8, wherein the instructions, when executed by the processor, further cause the processor to:
   in response to the one device accepting the private call, perform the private call.

10. A method for an electronic device, the method comprising:
    identifying an occurrence of a conference event for establishing a conference call in which a plurality of external electronic devices participate;
    identifying whether at least one of the plurality of external electronic devices is anonymous;

based on identifying that the at least one of the plurality of external electronic devices is anonymous, generating an identification key to be mutually shared by an anonymous electronic device among the plurality of external electronic devices and the electronic device and transmitting the identification key to the anonymous electronic device;

generating the conference call in which the plurality of external electronic devices participate;

identifying an occurrence of a separation event for generating a private call with one device among the plurality of external electronic devices participating in the conference call; and based on the identification key shared with the one device after identifying that the one device is anonymous, generating the private call.

11. The method of claim 10, further comprising:

based on identifying that the one device is anonymous, transmitting a message indicating the separation event to the one device; and in response to receiving the private call comprising the identification key from the one device, performing the private call with the one device by accepting the private call.

12. The method of claim 11, wherein the transmitting comprises generating and broadcasting the message indicating the separation event, the message comprising the identification key, and wherein the performing of the private call comprises, in response to receiving the private call comprising the identification key, accepting the private call.

13. The method of claim 10, further comprising:

notifying the plurality of external electronic devices participating in the conference call that the one device has been removed from the conference call.

14. The method of claim 10, further comprising:

in response to receiving an indication from the one device that the one device is leaving the conference call, holding the conference call and performing the private call.

15. The method of claim 10, further comprising:

in response to the private call with the one device terminating, identifying whether to re-invite the one device to the conference call; and based on the identification key shared with the one device when re-inviting the one device, transmitting, to the one device, a request for an invitation to the conference call.

16. The method of claim 10, further comprising:

identifying whether the electronic device itself is anonymous; and based on identifying that the electronic device itself is anonymous, generating the identification key to be mutually shared by a pair of the electronic device and each of the plurality of external electronic devices, respectively, and transmitting the identification key to each corresponding device among the plurality of external electronic devices.

17. The method of claim 16, further comprising:

identifying the occurrence of the separation event for generating the private call with the one device among the plurality of external electronic devices participating in the conference call; and based on identifying that the electronic device itself is anonymous, generating the private call comprising the identification key shared with the one device and transmitting the private call to the one device.

18. The method of claim 17, further comprising:

in response to the one device accepting the private call, performing the private call.

* * * * *